US009824542B2

(12) United States Patent
Amaitis et al.

(10) Patent No.: US 9,824,542 B2
(45) Date of Patent: Nov. 21, 2017

(54) AGGREGATE GAMING FUNDS

(71) Applicant: CFPH, LLC, New York, NY (US)

(72) Inventors: Lee Amaitis, Las Vegas, NV (US); Jacob Loveless, New York, NY (US); Quinton Singleton, Las Vegas, NV (US); Paul Williams, Las Vegas, NV (US)

(73) Assignee: CFPH, LLC, New York, NY (US)

( * ) Notice: Subject to any disclaimer, the term of this patent is extended or adjusted under 35 U.S.C. 154(b) by 563 days.

(21) Appl. No.: 13/760,631

(22) Filed: Feb. 6, 2013

(65) Prior Publication Data

US 2014/0221081 A1 Aug. 7, 2014

(51) Int. Cl.
*G06F 17/00* (2006.01)
*G07F 17/32* (2006.01)

(52) U.S. Cl.
CPC ................................ *G07F 17/3288* (2013.01)

(58) Field of Classification Search
CPC .... G07F 17/3288; G06Q 30/08; G06Q 40/04; G06Q 50/34
See application file for complete search history.

(56) References Cited

U.S. PATENT DOCUMENTS

| | | | | |
|---|---|---|---|---|
| 2001/0034662 | A1 * | 10/2001 | Morris | 705/26 |
| 2004/0015429 | A1 | 1/2004 | Tighe et al. | |
| 2004/0111358 | A1 * | 6/2004 | Lange et al. | 705/37 |
| 2004/0260640 | A1 * | 12/2004 | Crosthwaite et al. | 705/37 |
| 2006/0183547 | A1 | 8/2006 | McMongile et al. | |
| 2007/0192223 | A1 * | 8/2007 | Cifrese et al. | 705/36 R |
| 2009/0305777 | A1 | 12/2009 | Anderson | |
| 2010/0088250 | A1 | 4/2010 | Magnolia et al. | |
| 2012/0009984 | A1 * | 1/2012 | Amaitis et al. | 463/4 |

OTHER PUBLICATIONS

Notification of Transmittal of the International Search Report and the Written Opinion of the International Searching Authority dated May 21, 2014 (9 pages).

* cited by examiner

*Primary Examiner* — Dmitry Suhol
*Assistant Examiner* — Carl V Larsen
(74) *Attorney, Agent, or Firm* — Mark Miller

(57) ABSTRACT

Some embodiments include a fantasy sports games or other type of gaming options. A gaming entity may establish a fund of money that is to be exposed to a gaming market in an attempt to win money from risking the fund of money. A gaming operator may use the pool or fund to create liquidity in a gaming market. Various gamers may enter into games with the gaming entity by matching with various portions of the pool or fund.

16 Claims, 2 Drawing Sheets

AGGREGATE GAMING FUNDS

FIELD

Some embodiments may relate to sport events, games based on actions of players in live sport events, other types of events, and/or other types of games and/or wagers.

BACKGROUND

Gaming may include placing a wager and/or participating in a game related to an event in which money may be won if the event does or does not happen. Fantasy sports may include one or more games related to events taking place in real sports games.

SUMMARY

Figure 1:
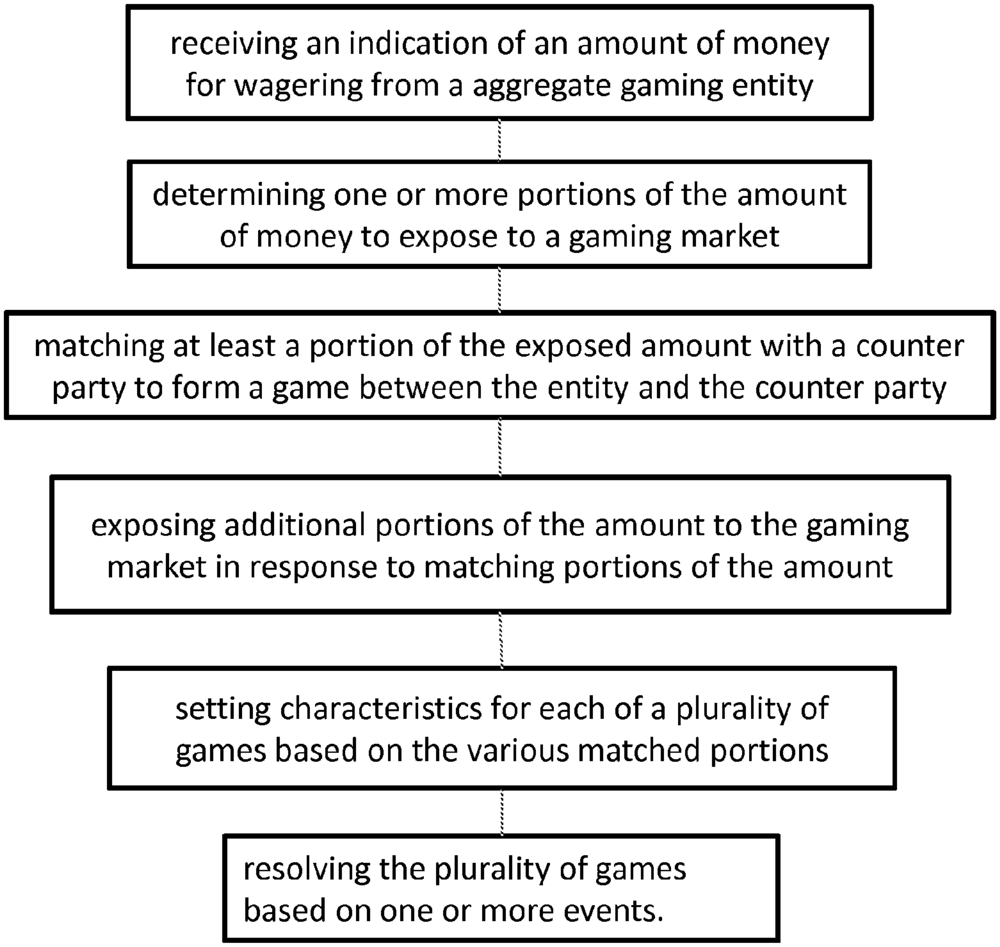
FIG. 1 shows an example method that may be used in some embodiments.

The following should be understood to be embodiments, not claims.

A. An apparatus comprising: a processor; and a non-transitory medium having stored thereon a plurality of instructions that when executed by the processor cause the apparatus to: receive an indication of an amount of money from a gaming entity; determine one or more portions of the amount of money to expose to a gaming market on behalf of the gaming entity; expose the one or more portions to the gaming market; match at least one portion of the exposed amount with at least one counter party to form at least one game between the entity and at least one counter party; determine one or more additional portions of the amount to expose to the gaming market based on matching the at least one portion expose the one or more additional portions of the amount to the gaming market in response to matching the at least one portion; set characteristics for the at least one game between the entity and the at least one counter party; and resolve the at least one game.

A.1. The apparatus of claim A, in which the one or more portions include a plurality of portions that sum to less than the amount of money. A.2. The apparatus of claim A, in which determining the one or more portions includes determining the one or more portions based on historical demand for games such that the portions are expected to meet expected demand. A.3. The apparatus of claim A, in which the gaming entity includes at least one of an algorithmic gaming entity, a hedge fund, and a mutual fund. A.4. The apparatus of claim A, in which the counter party includes a natural gamer.

A.5. The apparatus of claim A, in which exposing the one or more portions includes creating new fantasy sports leagues with a gaming operator that may be joined by other gamers. A.5.1. The apparatus of claim A.5, in which matching the at least one portion includes: receiving a request from the counter party to join a first league of the fantasy sports leagues and entering the counter party into the league to form the game. A.6. The apparatus of claim A, in which the apparatus includes a device of a gaming operator that forms games involving users in fantasy leagues. A.7. The apparatus of claim A, in which determining the one or more additional portions includes determining one or more replacement portions for the at least one portion. A.7.1. The apparatus of claim A.7, in which the one or more replacement portions are determining based on demand for gaming such that changing demand is expected to be met by the replacement portions.

A.8. The apparatus of claim A, in which the game includes a fantasy sports game and the characteristics include teams for each of the counter party and the gaming entity. A.8.1. The apparatus of claim A.8, in which the instructions cause the apparatus to: receive a first team from the gamer and a second team from the gaming entity; and set the characteristics to match the first team and second team. A.8.1.1. The apparatus of claim A.8.1, in which the characteristics include a spread between the first team and the second team and in which the instructions cause the apparatus to: determine a first sum of expected point value to be earned by a members of the first team and a second sum of expected point value to be earned by members of the second team; and determine the difference between the first sum and the second sum. A.8.1.1.1. The apparatus of claim A.8.1.1, in which each expected point value of each member is skewed down from a true expected value.

A.9. The apparatus of claim A, in which resolving the game includes determining an outcome for the game based on one or more events and adjusting one or more monetary accounts in response. A.10. The apparatus of claim A, in which the at least one portion includes a plurality of portions that are matched with respective counter interests from respective gamers to form respective games so that the gaming entity is entered into a plurality of respective games with a plurality of respective gamers. A.10.1. The apparatus of claim A.10, in which setting the characteristics for the at least one game includes setting characteristics for the plurality of respective games. A.10.1.1. The apparatus of claim A.10.1, in which each of the games of the plurality of respective games includes a fantasy sports game and in which the instructions cause the apparatus to receive a fantasy team from the gaming entity to be used for all of the plurality of games, in which the fantasy team is received as a single command from the entity to assign the team to all of the plurality of games.

A.11. The apparatus of claim A, in which the instructions cause the apparatus to: receive an indication of a second amount of money from the gaming entity; and expose at least one second portion of the second amount of money to the gaming market. A.11.1. The apparatus of claim A.11, in which the instructions cause the apparatus to: prevent a match between a portion of the amount of money and a portion of the second amount of money. A.11.2. The apparatus of claim A.11, in which the instructions cause the apparatus to: assign the at least one portion to the amount of money based on relationship that the gaming entity defined between the amount of money to the second amount of money. A.11.2.1. The apparatus of claim A.11.2, in which the relationship defines a ratio for matching gamers to the amount and the second amount. A.11.2.2. The apparatus of claim A.11.2, in which the instructions cause the apparatus to match the second portion to form a game between a second gamer and the gaming entity; and set characteristics to be different for the second game than the first game. A.11.3. The apparatus of claim A.11, in which the amount is based on a first algorithm operated by the gaming entity and the second amount is based on a second algorithm operated by the gaming entity. A.12. The apparatus of claim A, in which determining the one or more portions includes determining the portions to simulate a Dutch auction in which larger portions are exposed before smaller portions.

B. A method comprising: receiving, by a computing device of a gaming operator, an indication of an amount of money from a gaming entity; determining, by the computing device, one or more portions of the amount of money to expose to a gaming market on behalf of the gaming entity; exposing, by the computing device, the one or more portions to the gaming market; matching, by the computing device, at least one portion of the exposed amount with at least one counter party to form at least one game between the entity and at least one counter party; determining, by the computing device, one or more additional portions of the amount to expose to the gaming market based on matching the at least one portion; exposing, by the computing device, the one or more additional portions of the amount to the gaming market in response to matching the at least one portion; setting, by the computing device, characteristics for the at least one game between the entity and the at least one counter party; and resolving, by the computing device, the at least one game.

DETAILED DESCRIPTION

I. Example Embodiments

Some embodiments may facilitate a gaming entity's placement of large block of funds into a gaming market. For example, a hedge fund, mutual fund, fund manager of some sort, and/or some other entity may desire to risk a relatively large amount of money in a gaming market based on the occurrence of one or more events. For example, such an entity may desire to participate in a fantasy gaming market, a sports gaming environment, a casino wagering market, and/or any other type of gaming market. Such an entity may act as a professional manager or investor of funds, a block gamer, a liquidity provider, and/or any other participant in a gaming market.

Colloquially, gaming may be referred to as wagering but it should be understood that embodiments are not limited to the statutory definition of wagering that is limited to games of chance but rather may include games of skill, fantasy games, games of chance, and/or any other type of games and therefore the term gaming is used when discussing some embodiments rather than the term wagering. Gaming may include a risk of an amount of money that some event will happen. Such risk may be skill and/or risk based, booked and/or pari-mutuel, and/or take any form desired. Gaming may include paying a fee to enter into a contest that is based on the occurrence of an event. The winner of such a contest may be provided with an award (e.g., money based on a sum of contest entry fees). Wagering may be used herein to refer to such skill or risk based gaming in some instances and should not be understood to be limited to one or the other type of gaming unless specified otherwise. Gaming may include wagering, betting, risking money, paying an entry fee to a contest, and/or any other form of gaming as desired. Various embodiments may apply to any type of gaming in any combination and/or arrangement.

To facilitate the placement of money into the gaming market, the gaming operator may present portions of the money to a gaming market for the event. Other counter parties may enter into games with the entity for these portions. Additional portions may be presented to the market as such games are formed so that the entire amount may be entered into the market through such sub-games. Some embodiments may include various methods of facilitating such large block gaming. Some embodiments may include various methods for allowing gamers to pool funds and/or otherwise assign funds for professional management.

Fantasy Game Examples

In some embodiments, a game may be a fantasy game. It should be recognized that embodiments are not limited to fantasy games but that examples are given in terms of a fantasy game in a non-limiting manner. Moreover, examples of fantasy games and operation are also given in a non-limiting manner and other embodiments may include any fantasy or non-fantasy game or event on which a wager is placed as desired. U.S. patent application 61/479,539, Ser. No. 12/605,826, Ser. No. 13/160,746 and 61/668,245 are hereby incorporated herein by reference. Some example fantasy games and/or wagers that may be used in some embodiments are described in these references.

Various examples are given in relation to a popular variation of fantasy events, namely fantasy sports, but it should be understood that various embodiments may include any fantasy event. In some embodiments, fantasy sports may provide a manner for a participant to act in a role similar to a coach and/or general manager. In some embodiments, a participant may be given the ability to draft, create, trade, dismiss and/or otherwise manage a fantasy team.

The events, participants, and/or players to which a fantasy event may be related may include any desired events, participants, and/or players. For example, some events may include political events (e.g., elections), sporting events (e.g., football, baseball, basketball, hockey, soccer, rugby, golf, tennis, automotive racing, animal racing), competitions (poker, test taking, rock throwing, tree growing), other events, and so on. For example, some participants and/or players may include politicians, human players, animal participants, robots, natural phenomena, plants, physical things, and so on. It should be recognized that fantasy event competitions may be constructed based on any kind of activity. For example, fantasy competitions may be constructed based on an activity in which participants in the fantasy competition may compete vicariously based upon observations or statistics regarding some underlying activity (e.g., wind speed, elections, tree growth, baseball, and so on).

A team should be understood to include a club (e.g., soccer club), an individual in a one or more sport, one or more individuals in one or more events, and/or other variations of similar concepts. A fantasy team for an activity may include one or more members that each correspond to one or more respective real and/or active participants in the activity. For example, a fantasy team for a sport may include one or more players of the sport. The players may include active players in a real league for the sport. The players may include active league players from one or more real sports league.

In some embodiments, a member of a team may include a portion of a real team. For example, in some embodiments, in addition to and/or as an alternative to a particular member of a team being selected for a fantasy team, a portion of a team may be selected for a fantasy team. For example, a defensive team of a football team may be selected for a fantasy team regardless of actual members of the defensive team. Accordingly, scoring of such a fantasy team may relate to actions and/or performance of the entire defensive team rather than a single member of the team.

In some embodiments, a participant in a fantasy sports game may select members to form a fantasy team for a sport. In some embodiments, a participant may select or "draft", currently active real-life players to form a fantasy team. Accordingly, a fantasy team for a sport may include a plurality of members that each correspond to a respective player of the sport. In some embodiments, a selected member for a fantasy team may include a group of players (e.g., the defense of a particular football team may be a member of a fantasy team, the outfield of a particular baseball team may be a member of a fantasy team, and so on).

In some embodiments a plurality of participants may form a fantasy league and select players in the fantasy league. Each player in the league may pay a fee to join the league. The fee may be pooled by a gaming operator for use in award payment, booked by the gaming operator as a wager, and/or paid to the gaming operator as a fee. The fantasy league may be referred to as a fantasy game, and the winning participant in the league may receive some award (e.g., from the gaming operator, from pooled funds held by the gaming operator, based on a fee paid to join the league, etc.). As an example, in a fantasy football league, a plurality of league participants (e.g., two) may each select one or more professional football players (e.g., 5) onto their fantasy team and pay a fee to be part of the league (e.g., $10). Based on performance of those selected players in real sports events, the participants may earn points in the fantasy sports league and a winner may be determined and paid an award (e.g., $20 minus some rake taken by the gaming operator).

It should be recognized that the form of risk and/or relationship between and/or among the parties to such a game and/or a gaming operator may take any form. Terms such as form a game are used in a broad sense to refer to any such form. For example, a wager may be established directly between two participants, a contractual obligation may be established between a gaming operator and each of the participants separately, a pari-mutuel pool may be established into which money may be placed, a book of bets may be formed into which money may be placed, and/or any desired method of forming a game may be used. In some embodiments, to form a game, each participant in a game may pay a contest entry fee to enter the contest. Such fees may be pooled together and used to pay a winner. A data structure may record information regarding formed games, and/or other information about gamers and/or games.

In some embodiments, a central authority (e.g., a gaming operator) may establish and/or enforce rules for a fantasy sports game. Such a central authority may include a casino, a server, a house, a book maker, a web site, and/or any other desired gaming operator. Such a central authority may be referred to as a commissioner, and/or a treasurer. In some embodiments, multiple entities may operate as separate parts of such a central authority (e.g., one treasurer and one commissioner). In some embodiments, the central authority may be configured to determine outcomes of a game, accept wagers, adjust balances, accept money, determine if a game condition is satisfy, establish leagues, maintain accounts, pay winnings, perform a method to facilitate functionality described herein, and so on. A central authority may include one or more computing devices (e.g., servers, processors, mobile devices, and so on) configured to perform one or more actions in order to facilitate gaming.

One example of a game that may be used in some embodiments may include a Cantor 5 (or Cantor any number) game that may be offered by Cantor Gaming and/or Cantor Data Services. In such a game, a league may be opened (e.g., by player and/or operator). Some non-limiting examples are given in terms of a 2 person league, but a league may be any number of users (e.g., 2, 5, 10, etc.). When a league is full (e.g., players equal to the maximum number have joined), the league may be closed and a game may be formed between/among the players that joined the league. So, for example, a user may desire to play a $50 dollar Cantor 5 game and so may form a two person Cantor 5 league with a $50 buy-in (e.g., risked amount, contest entry fee) by entering information through a website. A second user may see the formed league through the website and may join the league. At that point, the players may be entered into a $50 game with one another. Cantor may take a cut of the buy-ins for offering the fantasy service and may use the rest of the buy-ins to pay an award to a winner of the game. Cantor may pool the buy-ins into a pool that may be used to provide a winner some award.

At some point before a start of a game and/or some other closing trigger, each player may be required to select members for their fantasy team. Members may be chosen in any manner (e.g., round robin, individually, and so on). In some embodiments, each player may independently choose a team so that a team of one player does not affect to team of another player and that each player may have some or all same players on their team. A gaming operator (e.g., Cantor) may set an expected point total for each team (e.g. based on historical performance of each player on the team). To set such an expected point total Cantor may intentionally skew the number lower to encourage players to choose higher performing players. Based on the assigned expected value of each team, a spread may be created between the team. For example, if team A is expected to earn 95 points and team B is expected to earn 97 points, then a 2 point spread between the teams may be formed. A winner may be determined for the game based on the play of real games so that if Team B, for example, wins by more than two points, team B is the winning team because it beat the spread.

It should be recognized that this example is only one non-limiting example and that any manner of fantasy gaming and/or or other gaming/wagering may be used as desired.

Example Methods

FIG. 1 illustrates an example method that may be performed in some embodiments to facilitate block gaming and/or any pooled gaming functions such as some described herein. The example method may be performed by a gaming operator, a gaming entity, a counter party to the gaming entity, a third party, another entity, and/or any combination thereof. In some embodiments, such a method may be performed by a computing device (e.g., a server of a gaming operator). Such a computing device may communicate with other computing devices (e.g., user devices, algorithmic wagering devices, etc.) such as through a user interface and/or API that allows gaming information to be entered and/or information about games to be communicated.

As indicated at 101, some embodiments may include receiving an indication of an amount of money for gaming from a gaming entity. Receiving such an indication may include receiving an indication of an amount to be risked in a gaming market with an ability to have a hidden amount (e.g., a hidden order size for a gaming market). Receiving such an indication may include receiving an indication of an amount that may be treated similar to a large block trading order in which parts of the order are worked separately to fulfill the whole order. Such an indication may be received through an API from a algorithmic gaming device by a gaming operator. Receiving may include receiving various characteristics that define one or more desired games and/or a sum of money risked in such games (e.g., wagers, fantasy games, sports bets). For example, an amount of money, how the money should be presented, a team for one or more games, how the amount should be used in relation to another amount, and/or any desired information may be received.

As indicated at 103, some embodiments may include determining one or more portions of the amount of money to expose to a gaming market. For example, a gaming operator may determine an expected demand for games of one or more sizes and in response may expose corresponding amounts of money to the gaming market (e.g., by offering games of such one or more denominations). Demand may be based on historical demand, current demand, and/or any other information. Any desired information may be used to determine an amount and/or a composition of games that sum to that amount (e.g., demand, instructions from the gaming entity, request from players, etc.) Exposing to the market may include offering one or more games for that amount of money and/or that sum to that amount of money in any combination of denominations (e.g., opening fantasy leagues and/or joining fantasy leagues with such buy-in amount(s)). An exposed amount may include an amount or sum of sub-amounts that may be accepted by other users to form a game. In some embodiments, a plurality of sub-amounts may be determined so that a variety of games is available to the public. For example, a large amount may be too large for some people but a small amount may be too small for some people, so multiple amounts may be exposed to give other gamers options depending on their budgets. In some embodiments, the sum of the offered multiple amounts may be less than or equal to the amount of money (and/or some sum of various amounts of money in embodiments where multiple blocks may be worked together) so that the gaming entity does not become over exposed beyond the amount of money that they desire to risk on the event.

Some embodiments may include exposing the amount of money in any combination of one or more games. Exposing may include joining a game that exists already and/or offering a game to other gamers. For example a league may be entered into and/or created using a respective portion amount, a wager exchange order may be entered, a wager may be placed with a casino, a wager may be laid, and/or any other action may be taken to expose an amount of money to a gaming market.

As indicated at 105, some embodiments may include matching at least a portion of the exposed amount with a counter party to form a game between the entity and the counter party. For example, an indication of a desire to join a league based on the at least the portion may be received from a counter-party (e.g., another gamer that desires to join a fantasy league, enter into a wager with the entity, etc.). Such a receipt of such an indication may include receiving an indication that the counter party desires to join the formed league through an interface of a website. It should be recognized that this example is non-limiting and that other methods of matching or determining matches may be used (e.g., exchange wagering, other non-league posting of gaming options such as a direct posting of wagers in an interface, etc.)

As indicated at 107, some embodiments may include exposing additional portions of the amount to the gaming market in response to matching portions of the amount. For example, a portion may be replaced with a new exposed portion each time a portion is matched. This matching and exposing may continue until the amount of money has been reached and/or an end time for joining a game on the event has been reached. A total exposure may be kept less than or equal to the amount of money and/or a sum of amount of money in embodiments where separate pools of money are worked together. In some embodiments, the portions exposed may be adjusted over time to meet a perceived need or desire. For example, high rollers may come in to the market as the event nears and so larger portions may be exposed over time to attract such high rollers. In some embodiments, the portions may be exposed to simulate activity in the gaming market for the event so that as the event draws near people become more excited about the event (e.g., by exposing and unexposing portions and/or increasing and decreasing the amount exposed to simulate activity in the market). At the end of such activity, multiple games may be formed involving the entity and various counter-parties that may sum to the amount of money or less than that amount (or greater in embodiments where multiple pools are worked together as is discussed elsewhere herein).

Forming of such games may take any form as discussed elsewhere. For example, a contractual agreement (e.g., a contract, a wager, etc.) may be entered into between each party and the entity. Such an agreement may obligate a loser to pay or allow a winner in each game to take some amount of money (e.g., a buy-in, a risked amount). As another example, a contractual agreement may be entered into between each party and the gaming operator and the gaming entity and the gaming operator. Such an agreement may obligate a gaming operator to pay a winning entity some amount of money in each game (e.g., a buy-in amount, a risked amount). A gaming operator may take some fee to facilitate such services (e.g., from the buy-in or risked amounts). As another example, a contest entry fee may be paid (e.g., transferred from an account to a pool) to form a game. One or more data structure entries may be made to indicate a formation of a game so that information about the game may be tracked. It should be recognized that any manner of forming a game (whether a wager or other type of game in which money may be risked) may be used in various embodiments and that various methods of doing so are known in the art.

As indicated at 109, some embodiments may include setting characteristics for each of a plurality of games based on the various matched portions. In some embodiment, the games may be fantasy games and/or other types of games or wagers that require some element to be set. For example, the team for each of the counter-parties and the gaming entity in each fantasy game may be required to be set after a league is formed. A gaming operator may allow a party to each of the games to enter the team at some time between the event and the forming of the league (e.g., up until the end of start of an event on which a game is based).

In some embodiments, a gaming entity may set all of the teams for the various games based on the various portions of the amount together to a single team by submitting a single command. A gaming operator may receive the command, and in response set all of the teams in the multiple games. By allowing a gaming entity to submit a single command to set all of such teams, the transmission time and/or latency may be minimized compared to a traditional environment in which each game may be required to have a team set separately. This type of single command may work well in embodiments where duplication in teams may be allowed because the entity's team may not depend on a counter party's team. Accordingly, such a single team may provide the gaming entity with a longer time period to obtain information and decide on a team (e.g., a time period with less latency or other transmission delays). In other embodiments, no such duplication may be allowed so that the entity may be required to select teams for each game that may be dependent on how the other player(s) in the league pick team(s) and so may be done individually or according to some algorithm based on the other player's actions.

As indicated at 111, some embodiments include resolving the plurality of games based on one or more events. For example, an outcome of one or more games, a performance of one or more players, and so on may be determined by a gaming operator. According to a definition of a fantasy game or other game/wager, the information may be used to determine the outcome of each of the games. The winner of each wager may be paid according to the rules of the game. Various examples of games are well known in the art and/or described herein and one of ordinary skill in the art would understand how to determine a winner of such games and resolve such games.

In some embodiments, an entity that submits an amount for gaming such as at block 101 may include an algorithmic gaming entity. Such an entity may use sophisticated data processing technology to determine an amount of money to be risked and/or one or more characteristics of a game (e.g., team in a fantasy game). Such an entity may include a hedge fund or quantitative/high speed trading entity. The algorithm could interact with an API of a gaming operator to submit information about the games and/or amounts. The algorithm could operate on a computer system and communicate over a network to a computer system run by the gaming operator.

In some embodiments, multiple algorithms may be submitted to a gaming operator. Such algorithms could compete against each other such as in a trading environment in which multiple algorithmic traders engage in trading behavior against one another. In some embodiments a single entity could submit game information through multiple algorithms so that they do not compete with one another.

In some embodiment, an algorithmic gaming entity could only be allowed to or could only be used to form new leagues or otherwise offer new games (e.g., offer wagers). Accordingly, by not entering into existing games, the algorithmic gaming entity would not enter into games with itself. In some embodiments, an algorithmic gaming entity could both form new games and enter into existing games. In such an embodiment, an entity may still be prevented from entering into a game with itself by a gaming operator monitoring originators/members of games and preventing such an entity to itself enter into a game that it formed and/or has already joined.

In some embodiments, in which a single entity uses multiple algorithms for gaming, a ratio of exposure or fill between algorithms may be established. For example, a first algorithm and second algorithm may be filled or exposed in a pro-rata fashion, 3 to 1 ratio, a first in first out manner, etc. For example exposure may take place so that the amount of money that has been exposed from each algorithm follows the desired method of exposure. As another example, filling may take place according to the desired method regardless of exposure (e.g., the exposed portions may not be tied to an algorithm until they are matched). For example, if a 1 to 1 ratios is supposed to be exposed then for each 500 in one algorithm exposed 500 in another could be exposed. In an example in which the fill is desired in a 1 to 1 ratio, two 500s could be exposed (at the same time or sequentially) and the first matched and then assigned to algorithm 1 and then the second matched and based on the ratio matched to algorithm 2. A determination of which algorithm to assign could be made in response to the match based on the ratio and the current state of fill of each amount.

In some embodiments, a gaming operator may be responsible for and/or have influence over determining portions to expose to a market. In other embodiments, an entity may submit commands on how to expose portions and the gaming operator may follow such instructions. In still other embodiments, the gaming entity may be responsible for submitting each new portion separately rather than as a block.

For example, in some embodiments, a gaming operator may indicate a preference for matching and/or exposing larger portions of a block amount over smaller portions of a block amount. Accordingly, a larger portion may first be exposed over a smaller portion. In some embodiments, if both a larger portion and a smaller portion are matched, the smaller portion may be ignored so that the larger portion may be matched. As another example, an entity may determine that it does not want to accept matches from certain gamers, at certain times of the day, below a certain size, above a certain size, above a certain number with a same entity, and so on. As another example, an auction system may be used in which game denominations (e.g. exposed amounts or portions) are adjusted over time (e.g., lowered) so that certain gamers are given an earlier chance to enter into games over other gamers (e.g., high rollers over normal gamers). Accordingly, portions that are determined for exposure may be chosen to simulate a Dutch auction in which larger amounts are exposed before smaller amounts. It should be recognized that any manner of giving preference to forming and/or exposing one type of game or size of game may be used in various embodiments.

In some embodiments, rather than a hidden size type functionality as described with respect to some embodiments, a full size may be exposed and/or a size larger than the portions described above may be exposed. For example, a large amount of money may be exposed to the market but not tied to specific game portions. For example, $10,000 may be exposed to the market as available for gaming in a particular type of game. The type of gaming may not be limited to denominations (other than less than or equal to $10,000). Such an exposed amount may be displayed to gamers through a user interface. Gamers may respond by entering game requests with respect to that exposed amount (e.g., entering into leagues). As part of the request for the amount, gamers may enter a portion that they desire to form a game with. For example, a first user may form a league with the entity for $1000 and a second user may form a league for $500. In response to the garners entering information about their desired games, the exposed amount may be reduced accordingly (e.g., in a first come first served fashion) until none is left. Such an embodiment may allow users to enter customized desired sizes up to the amount rather than responding to pre-set sizes as in some embodiments described herein.

In some embodiments, a gaming entity may influence a manner in which portions are matched to such an amount of money. For example, a gaming entity may accept the given first come first serve (also known as FIFO) matching method in some embodiments. In other embodiments, a gaming entity may establish a different matching algorithm. For example, such a different algorithm may include an algorithm that accounts for portion size, identity of user, and/or any other characteristic. For example, an entity may indicate that it prefers to have larger portions matched over smaller portions, so a preference may be given to larger portions even if smaller portions are identified first. While this may be non-traditional matching, it may provide a greater ability for high-rollers to enter into desired games and also a greater chance of finding matches for the entire amount. In some embodiments, an auction method may be used to match a gaming entity with counter parties (e.g., a Dutch auction). As another example, an entity may determine that it does not want to accept matches from certain garners, at certain times of the day, below a certain size, above a certain size, above a certain number with a same entity, and so on.

It should be recognized that any manner of giving order or preference to one match over another may be used in various embodiments as desired whether in a hidden order embodiments or a non-hidden order embodiment. Moreover, it should be recognized that while some embodiments are described as a gaming entity influencing such a matching method, other embodiments may include a gaming operator choosing and executing such matching functionality.

In some embodiments, an entity that enters games through a gaming operator (e.g., an entity that submits an amount of money to be worked as a block, a garner, etc.) may be a fund through which users may invest money in gaming activity. For example, such an entity may include a mutual fund, a hedge fund, etc. this would allow users to enter money into the fund and get a possible return from gaming activity of the fund. Such a fund may be a private fund and/or a public fund. Such a fund may be listed on an exchange and/or regulated by a securities regulating agency. In some embodiments, a fund may accept money from fund participant. A fund may invest the money in gaming activity (e.g., according to a prospectus and/or algorithm). The fund may also invest money in non-gaming activity such as stocks and bonds. In some embodiments, a fund may sell shares of the fund to the public. In some embodiments, a fund may allow the public to redeem shares of the fund for an increase or decrease in value depending on the outcomes of activities (e.g., games such as fantasy games and/or wagers) made by the fund. In some embodiments, a share may amount to a portion of ownership in the fund or a pool of money managed by the fund. In some embodiments, users may trade shares on an exchange of some sort to other user in secondary trading. Various embodiments may include any desired type of fund, shares trading, redeeming of investments, exchanges, and/or other functionality as desired in any combination.

In some embodiments, an entity that enters games through a gaming operator (e.g., an entity that submits an amount of money to be worked as a block, a gamer, etc.) may be a professional fund manager. Such a manager may be a celebrity (e.g., a previous player of a sport). Users may give money to the fund manager for the manger to enter games. In response to entering the games, the fund manager may provide a return to the users (e.g., return the money plus winnings and/or minus losings). Such return may be on demand from the users and/or after some period of time has passed. The money may be pooled together with other users' money and/or separately managed for each user.

In some embodiments, rather than placing money with a professional manager, a gamer may "subscribe" to the picks of such a professional manager. A gamer may identify that Celebrity A has a gaming style that he or she desires to emulate. The gamer may enter into one or more games (e.g., fantasy leagues) in accordance with that style of gaming. The elements of the style that are emulated may include any desired characteristics of Celebrity A's gaming style (e.g., risked amount, team selection, taunting, amount of team adjusting before team must be set, time of entering into games, and so on). The gamer may identify the characteristics and/or a gaming operator may assign the characteristics in response to receiving an identification that the gamer desires to emulate Celebrity A. For example, in some embodiments, the gamer may then enter into fantasy leagues or other games that are based on the risk of some amounts of money (e.g., amounts selected by the gamer and/or selected to emulate Celebrity A). The gamer's teams in such leagues may be selected for him or her to match a team selected by Celebrity A. Accordingly, the gamer may have given up choosing one component of his or her game and outsourced it to Celebrity A. In some embodiments the gamer may adjust his or her team even though subscribed to Celebrity A so that his or her team may deviate from the Celebrity A team if he or she desires. In response to receiving a selection of a team (e.g., for a fantasy period such as a weekend, a week, a season) from Celebrity A, games that are assigned to emulate Celebrity A may be assigned to have that same team. Changes may be made by Celebrity A and may be correspondingly made to the teams assigned to the emulating gamers. Celebrity A may charge a subscription fee for such a service.

In some embodiments, exposed amounts offered by such pooled and/or professional funds/mangers may be identified as being placed by a special entity through an interface when presented to counter parties (e.g., other gamers). Some gamers may not feel comfortable entering into games with such entities and so may avoid that type of game and instead opt to game against natural gamers (e.g., non-professional gamers, natural people rather than funds). In some embodiments, a rebate or other incentive may be provided when a natural gamer enters into a wager with such a non-natural gamer. For example, the natural gamer (or the non-natural gamer in other embodiments) may be given some percentage of a rebate, a bettering of odds, and/or any other incentive to enter into the wager. Such a rebate may be given in response to a determination that a game involves one or more natural gamers and one or more non-natural gamers.

It should be recognized that while various examples of embodiments have been given, that such embodiments are given as non-limiting examples only. Other embodiments may include some, all, or none of such functionality and may be combined together in any manner with any other desired functionality or functionality described herein. For example, although some embodiments discuss fantasy gaming, it would be understood that other embodiments may include any type of gaming whether fantasy, sports book, regular casino wagering, exchange based wagering or any other form.

Example Systems

Figure 2:
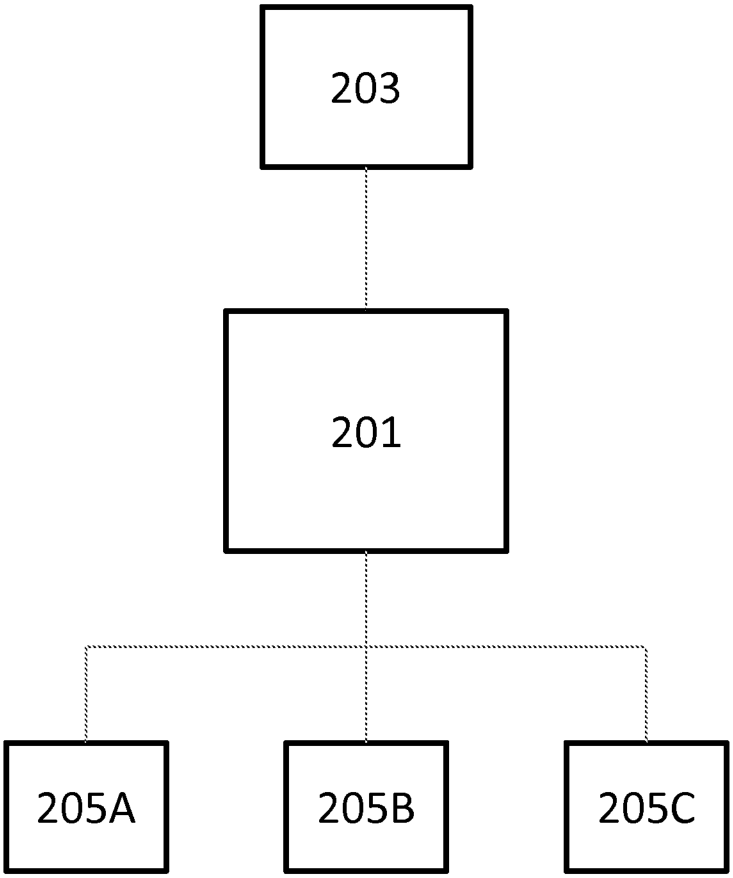
FIG. 2 shows an example system that may be used in some embodiments.

FIG. 2 illustrates an example one or more systems that may be used to facilitate functionality of one or more embodiments. As indicated in FIG. 2, some embodiments may involve a gaming operator 201, a fund/professional entity 203, and a plurality of gamers 205A-C.

Gaming Operator 201 may include an entity that enables gaming functionality. For example Cantor Gaming and/or Cantor Data Services may be a gaming entity. A gaming entity may perform a method such as that of FIG. 1. A gaming entity may include one or more computing devices that may operate to perform such a method. For example, such a computing device may include a server that accepts game requests, forms games, resolves games, manages games, manages accounts, and/or provides any desired gaming related functionality. A gaming entity may include a provider of cloud services (e.g., a provider of gaming services, pooling services, etc. to a cloud computing environment). Gaming operator 201 may provide any desired services such as an API, an interface, accounting services, odds setting services, outcome determination services, and so on. One or more data structures may be maintained by a gaming operator to store information regarding games, fees, players, odds, historical outcomes, accounts, and so on.

Fund/professional entity 203 may include an entity that manages money for gaming and/or provides professional gaming services. For example, such an entity may include a hedge fund or high frequency trading company that includes gaming as a component of their investment strategy. A fund/professional entity may include one or more computing devices that may operate to engage in gaming through the gaming operator. For example, such a computing device may include a server that determines a gaming algorithm and communicates gaming desires with the gaming operator. Fund/professional entity may provide any desired services such as accounting services, money accepting services, share redemption services, share exchanging services, and so on Gamers 205A-C may include entities that game through the gaming operator (e.g., natural gamers such as ordinary people, another fund/professional entity, and so on). For example, such gamers may include people that access a website or gaming application to enter gaming information to the gaming operator. A gamer may include one or more computing devices that may operate to engage in gaming through the gaming operator. For example, such a computing device may include a mobile device or other client device that may provide an interface through which a gamer may enter gaming information to the gaming operator (e.g., amount of money risked in a game, characteristics of a game).

As illustrated, some embodiments may include one or more communication networks that may allow gamers, gaming operator, and/or fund/professional entity to communicate among/between one another. Such a network may include the Internet, one or more LANs, and so on that may be arranged in any combination as desired. Information regarding games may be communicated through such a network to facilitate functionality such as that described herein.

It should be recognized that the example system of FIG. 2 is given as a non-limiting example only. Various embodiments may include any desired system and/or components in any arrangement. For example, other embodiments may include a single gaming entity and fund/professional entity acting together rather than as separate entities. As another example, other embodiments may include additional entities that provide some of the described functionality and/or additional functionality (e.g., auditing, accounting, data gathering, outcome determining, data sources, and so on). As another example, a gaming operator and/or fund/professional entity may be part of a cloud gaming service that provides functionality to gamers to engage in gaming. A separate account may be maintained elsewhere in such a cloud and/or may be maintained specifically for the gaming operator. Accordingly, a user accessing the cloud may use funds from an account provider in some embodiments and/or be limited to using funds associated with the gaming operator depending on the arrangement of such an embodiment. Funds in the account provider for example may be funds associated with a portal through which the user accesses the cloud (e.g., a casino) that may make the funds available to a plurality of gaming services that are attached to the cloud. Some embodiments may include one or more components of such a cloud service that may operate to provide gaming functionality.

Although various examples are given in terms of some special entity (e.g., a fund or professional) engaged in block gaming, it should be recognized that embodiments are not so limited. Any gaming participant may engage in such gaming in some embodiments. For example such ability may be offered to all gamers in a gaming market in some embodiments. Such functionality may be offered with a minimum amount of money to be entered or with any amount of money.

Cantor Fantasy Pooling Examples

As a concrete example of one implementation, a Cantor five game is used. A fund identifies to a gaming operator that $10,000 is available for gaming in a first algorithmic manner and $5,000 is available for gaming in a second algorithmic manner and that a 2 to 1 ratio of matching to algorithmic manners should be used. The gaming operator may expose four leagues based on the available funds: one for $1,000, one for $500, one for $250, and one for $125. Gamers may enter into each of these and replacements may be exposed as they do. For this example, only these four exposed leagues may be matched by the time a gaming window ends (e.g., an event begins and/or a time before the event becomes too short). To make the 2 to 1 ratio work as closely as possible, 1250 dollars may be assigned to the first algorithm and 625 dollars may be assigned to the second algorithm (e.g. by a gaming operator and/or by a gaming entity). The assignment may take place at any time and in any manner (e.g., at the close of the window, as each amount is exposed, when teams are assigned to the algorithms, etc.). Each of the gamers may choose teams (e.g., by the close of the window). The fund may assign teams for each algorithm (e.g., by the end of the window). The teams may be assigned at a size time, before, and/or after a time when a game is assigned to an algorithm. The gaming operator may receive information identifying the play of players in live games and determine the outcomes of the leagues in response. Money may then be assigned to winners of the leagues. It should be recognized that this example is given as a non-limiting example only.

The following sections provide a guide to interpreting the present application.

II. Terms

The term “product” means any machine, manufacture and/or composition of matter, unless expressly specified otherwise.

The term “process” means any process, algorithm, method or the like, unless expressly specified otherwise.

Each process (whether called a method, algorithm or otherwise) inherently includes one or more steps, and therefore all references to a “step” or “steps” of a process have an inherent antecedent basis in the mere recitation of the term ‘process’ or a like term. Accordingly, any reference in a claim to a ‘step’ or ‘steps’ of a process has sufficient antecedent basis.

The term “invention” and the like mean “the one or more inventions disclosed in this application”, unless expressly specified otherwise.

The terms “an embodiment”, “embodiment”, “embodiments”, “the embodiment”, “the embodiments”, “one or more embodiments”, “some embodiments”, “certain embodiments”, “one embodiment”, “another embodiment” and the like mean “one or more (but not all) embodiments of the disclosed invention(s)”, unless expressly specified otherwise.

The term “variation” of an invention means an embodiment of the invention, unless expressly specified otherwise.

A reference to “another embodiment” in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget, but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget, but does not include anything else.

The term "compose" and variations thereof means "to make up the constituent parts of, component of or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of" when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of" each of the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

III. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

IV. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

V. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

VI. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth □, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VII. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VIII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

IX. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

X. Incorporation by Reference

Any patent, patent application or other document referred to herein is incorporated by reference into this patent application as part of the present disclosure, but only for purposes of written description and enablement in accordance with 35 U.S.C. §112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

XI. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XII. Cards

Playing cards have been in existence for many years. Although there are many types of playing cards that are played in many different types of games, the most common type of playing cards consists of 52 cards, divided out into four different suits (namely Spades, Hearts, Diamonds and Clubs) which are printed or indicated on one side or on the face of each card. In the standard deck, each of the four suits of cards consists of 13 cards, numbered either two through ten, or lettered A (Ace), K (King), Q (Queen), or J (Jack), which is also printed or indicated on the face of each card. Each card will thus contain on its face a suit indication along with a number or letter indication. The King, Queen, and Jack usually also include some sort of design on the face of the card, and may be referred to as picture cards. Other types of playing cards are described herein, but it should be recognized that various topics may apply to any, some, and/or all type of playing cards.

In some cases, the 52 card standard playing deck also contains a number of extra cards, sometimes referred to as jokers, that may have some use or meaning depending on the particular game being played with the deck. For example, if a card game includes the jokers, then if a player receives a joker in his "hand" he may use it as any card in the deck. If the player has the ten, jack, queen and king of Spades, along with a joker, the player would use the joker as an Ace of Spades. The player will then have a Royal Flush (ten through Ace of Spades).

Many different games can be played using a standard deck of playing cards. The game being played with the standard deck of cards may include other items, such as game boards, chips, etc., or the game being played may only need the playing card deck itself. In most of the games played using a standard deck of cards, a value is assigned to each card. The value may differ for different games.

Usually, the card value begins with the number two card as the lowest value and increases as the numbers increase through ten, followed in order of increasing value with the Jack, Queen, King and Ace. In some games the Ace may have a lower value than the two, and in games where a particular card is determined to be wild, or have any value, that card may have the greatest value of all. For example, in card games where deuces, or twos, are wild, the player holding a playing card containing a two can use that two as any other card, such that a nine and a two would be the equivalent of two nines.

Further, the four different suits indicated on the cards may have a particular value depending on the game. Under game rules where one suit, i.e., Spades, has more value than another suit, i.e., Hearts, the seven of Spades may have more value than the seven of Hearts.

It is easy to visualize that using the different card quantity and suit values, many different games can be played. In certain games, it is the combination of cards that one player obtains that determines whether or not that player has defeated the other player or players. Usually, the more difficult the combination is to obtain, the more value the combination has, and the player who obtains the more difficult combination (also taking into account the value of the cards) wins the game.

For instance in the game of Poker, each player may ultimately receive five cards. The player who obtains three cards having similar numbers on their face, i.e., the four of Hearts, four of Diamonds and four of Clubs, will defeat the player having only two cards with the same numerical value, i.e., the King of Spades and the King of Hearts. However, the player with five cards that all contain Clubs, commonly known as a flush, will defeat the player with the same three of a kind described above.

In many instances, a standard deck of playing cards is used to create gaming machines. In these gaming machines players insert coins and play certain card games, such as poker, using an imitation of standard playing cards on a video screen, in an attempt to win back more money than they originally inserted into the machine.

Another form of gambling using playing cards utilizes tables, otherwise known as table games. A table uses a table and a dealer, with the players sitting or standing around the table. The players place their bets on the table and the dealer deals the cards to each player. The number of cards dealt, or whether the cards are dealt face up or face down, will depend on the particular table game being played.

Further, an imitation or depiction of a standard playing card is used in many handheld electronic games, such as poker and blackjack, and in many computer games and Internet games. Using a handheld electronic game or a computer terminal that may or may not be connected to the Internet, a player receives the imitation playing cards and plays a card game either against the computer or against other players. Further, many of these games can be played on the computer in combination with gambling.

Also, there are many game shows that are broadcasted on television that use a deck of playing cards in the game play, in which the cards are usually enlarged or shown on a video screen or monitor for easy viewing. In these television game shows, the participants play the card game for prizes or money, usually against each other, with an individual acting as a host overseeing the action.

Also, there are lottery tickets that players purchase and play by "scratching off" an opaque layer to see if they have won money and prizes. The opaque layer prevents the player from knowing the results of the lottery ticket prior to purchasing and scratching off the layer. In some of these lottery tickets, playing cards are used under the opaque layer and the player may need to match a number of similar cards in order to win the prizes or money.

XIII. Rules of Card Games

Rules of Poker

In a basic poker game, which is played with a standard 52-card deck, each player is dealt five cards. All five cards in each player's hand are evaluated as a single hand with the presence of various combinations of the cards such as pairs, three-of-a-kind, straight, etc. Determining which combinations prevail over other combinations is done by reference to a table containing a ranking of the combinations. Rankings in most tables are based on the odds of each combination occurring in the player's hand. Regardless of the number of cards in a player's hand, the values assigned to the cards, and the odds, the method of evaluating all five cards in a player's hand remain the same.

Poker is a popular skill-based card game in which players with fully or partially concealed cards make wagers into a central pot. The pot is awarded to the player or players with the best combination of cards or to the player who makes an uncalled bet. Poker can also refer to video poker, a single-player game seen in casinos much like a slot machine, or to other games that use poker hand rankings.

Poker is played in a multitude of variations, but most follow the same basic pattern of play.

The right to deal each hand typically rotates among the players and is marked by a token called a 'dealer' button or buck. In a casino, a house dealer handles the cards for each hand, but a button (typically a white plastic disk) is rotated clockwise among the players to indicate a nominal dealer to determine the order of betting.

For each hand, one or more players are required to make forced bets to create an initial stake for which the players will contest. The dealer shuffles the cards, he cuts, and the appropriate number of cards are dealt to the players one at a time. Cards may be dealt either face-up or face-down, depending on the variant of poker being played. After the initial deal, the first of what may be several betting rounds begins. Between rounds, the players' hands develop in some way, often by being dealt additional cards or replacing cards previously dealt. At the end of each round, all bets are gathered into the central pot.

At any time during a betting round, if a player makes a bet, opponents are required to fold, call or raise. If one player bets and no opponents choose to match the bet, the hand ends immediately, the bettor is awarded the pot, no cards are required to be shown, and the next hand begins. The ability to win a pot without showing a hand makes bluffing possible. Bluffing is a primary feature of poker, one that distinguishes it from other vying games and from other games that make use of poker hand rankings.

At the end of the last betting round, if more than one player remains, there is a showdown, in which the players reveal their previously hidden cards and evaluate their hands. The player with the best hand according to the poker variant being played wins the pot.

The most popular poker variants are as follows:

Draw Poker

Players each receive five—as in five-card draw—or more cards, all of which are hidden. They can then replace one or more of these cards a certain number of times.

Stud Poker

Players receive cards one at a time, some being displayed to other players at the table. The key difference between stud and 'draw' poker is that players are not allowed to discard or replace any cards.

Community Card Poker

Players combine individually dealt cards with a number of "community cards" dealt face up and shared by all players. Two or four individual cards may be dealt in the most popular variations, Texas hold'em and Omaha hold'em, respectively.

Poker Hand Rankings

Straight Flush

A straight flush is a poker hand such as Q♠ J♠ 10♠ 9♠ 8♠, which contains five cards in sequence, all of the same suit. Two such hands are compared by their high card in the same way as are straights. The low ace rule also applies: 5♦ 4♦ 3♦ 2♦ A♦ is a 5-high straight flush (also known as a "steel wheel"). An ace-high straight flush such as A♣ K♣ Q♣ J♣ 10♣ is known as a royal flush, and is the highest ranking standard poker hand (excluding five of a kind).

Examples:

7♥ 6♥ 5♥ 4♥ 3♥ beats 5♠ 4♠ 3♠ 2♠ A♠

J♣ 10♣ 9♣ 8♣ 7♣ ties J♦ 10♦ 9♦ 8♦ 7♦

Four of a Kind

Four of a kind, or quads, is a poker hand such as 9♣ 9♠ 9♦ 9♥ J♥, which contains four cards of one rank, and an unmatched card. It ranks above a full house and below a straight flush. Higher ranking quads defeat lower ranking ones. Between two equal sets of four of a kind (possible in wild card and community card games), the kicker determines the winner.

Examples:

10♣ 10♦ 10♥ 10♠ 5♦ ("four tens" or "quad tens") defeats 6♦ 6♥ 6♠ 6♣ K♠ ("four sixes" or "quad sixes")

10♣ 10♦ 10♥ 10♠ Q♣ ("four tens, queen kicker") defeats 10♣ 10♦ 10♥ 10♠ 5♦ ("four tens with a five")

Full House

A full house, also known as a boat or a full boat, is a poker hand such as 3♣ 3♠ 3♦ 6♣ 6♥, which contains three matching cards of one rank, plus two matching cards of another rank. It ranks below a four of a kind and above a flush. Between two full houses, the one with the higher ranking set of three wins. If two have the same set of three (possible in wild card and community card games), the hand with the higher pair wins. Full houses are described by the three of a kind (e.g. Q-Q-Q) and pair (e.g. 9-9), as in "Queens over nines" (also used to describe a two pair), "Queens full of nines" or simply "Queens full".

Examples:

10♠ 10♥ 10♦ 4♠ 4♦ ("tens full") defeats 9♥ 9♣ 9♠ A♥ A♣ ("nines full")

K♠ K♣ K♥ 3♦ 3♠ ("kings full") defeats 3♠ 3♥ 3♦ K♠ K♣ ("threes full")

Q♥ Q♦ Q♣ 8♥ 8♣ ("queens full of eights") defeats Q♥ Q♦ Q♣ 5♠ 5♥ ("queens full of fives")

Flush

A flush is a poker hand such as Q♣ 10♣ 7♣ 6♣ 4♣, which contains five cards of the same suit, not in rank sequence. It ranks above a straight and below a full house. Two flushes are compared as if they were high card hands. In other words, the highest ranking card of each is compared to determine the winner; if both have the same high card, then the second-highest ranking card is compared, etc. The suits have no value: two flushes with the same five ranks of cards are tied. Flushes are described by the highest card, as in "queen-high flush".

Examples:

A♥ Q♥ 10♥ 5♥ 3♥ ("ace-high flush") defeats K♠ Q♠ J ♠ 9♠ 6♠ ("king-high flush")

A♦ K♦ 7♦ 6♦ 2♦ ("flush, ace-king high") defeats A♥ Q♥ 10♥ 5♥ 3♥ ("flush, ace-queen high")

Q♥ 10♥ 9♥ 5♥ 2♥ ("heart flush") ties Q♠ 10♠ 9♠ 5♠ 2 ♠ ("spade flush")

Straight

A straight is a poker hand such as Q♣ J♠ 10♠ 9♥ 8♥, which contains five cards of sequential rank, of varying suits. It ranks above three of a kind and below a flush. Two straights are ranked by comparing the high card of each. Two straights with the same high card are of equal value, and split any winnings (straights are the most commonly tied hands in poker, especially in community card games). Straights are described by the highest card, as in "queen-high straight" or "straight to the queen".

A hand such as A♣ K♣ Q♦ J♠ 10♠ is an ace-high straight, and ranks above a king-high straight such as K♥ Q ♠ J♥ 10♥ 9♦. But the ace may also be played as a 1-spot in a hand such as 5♠ 4♦ 3♦ 2♠ A♣, called a wheel or five-high straight, which ranks below the six-high straight 6 ♠ 5♣ 4♣ 3♥ 2♥. The ace may not "wrap around", or play both high and low in the same hand: 3♣ 2♦ A♠ K♠ Q♣ is not a straight, but just ace-high no pair.

Examples:

8♠ 7♠ 6♥ 5♥ 4♠ ("eight-high straight") defeats 6♦ 5 ♠ 4♦ 3♥ 2♣ ("six-high straight")

8♠ 7♠ 6♥ 5♥ 4♠ ties 8♥ 7♦ 6♣ 5♣ 4♥

Three of a Kind

Three of a kind, also called trips, set or a prile, is a poker hand such as 2♦ 2♠ 2♥ K♠ 6♠, which contains three cards of the same rank, plus two unmatched cards. It ranks above two pair and below a straight. Higher ranking three of a kind defeat lower ranking three of a kinds. If two hands have the same rank three of a kind (possible in games with wild cards or community cards), the kickers are compared to break the tie.

Examples:

8♠ 8♥ 8♦ 5♠ 3♣ ("three eights") defeats 5♣ 5♥ 5♦ Q♦ 10♣ ("three fives")

8♠ 8♥ 8♦ A♣ 2♦ ("three eights, ace kicker") defeats 8 ♠ 8♥ 8♦ 5♠ 3♣ ("three eights, five kicker")

Two Pair

A poker hand such as J♥ J♣ 4♣ 4♠ 94, which contains two cards of the same rank, plus two cards of another rank (that match each other but not the first pair), plus one unmatched card, is called two pair. It ranks above one pair and below three of a kind. Between two hands containing two pair, the higher ranking pair of each is first compared, and the higher pair wins. If both have the same top pair, then the second pair of each is compared. Finally, if both hands have the same two pairs, the kicker determines the winner. Two pair are described by the higher pair (e.g., K♥ K♣) and the lower pair (e.g., 9♠ 9♦), as in "Kings over nines", "Kings and nines" or simply "Kings up".

Examples:

K♥ K♦ 2♣ 2♦ J♥ ("kings up") defeats J♦ J♠ 10♠ 10 ♣ 9♠ ("jacks up")

9♣ 9♦ 7♦ 7♠ 6♥ ("nines and sevens") defeats 9♥ 9 ♠ 5♥ 5♦ K♣ ("nines and fives")

4♠ 4♣ 3♠ 3♥ K♦ ("fours and threes, king kicker") defeats 4♥ 4♦ 3♦ 3 10♠ ("fours and threes with a ten")

One Pair

One pair is a poker hand such as 4♥ 4♠ K♠ 10♦ 5♠, which contains two cards of the same rank, plus three unmatched cards. It ranks above any high card hand, but below all other poker hands. Higher ranking pairs defeat lower ranking pairs. If two hands have the same rank of pair, the non-paired cards in each hand (the kickers) are compared to determine the winner.

Examples:

10♣ 10♠ 6♠ 4♥ 2♥ ("pair of tens") defeats 9♥ 9♣ A♥ Q♦ 10♦ ("pair of nines")

10♥ 10♦ J♦ 3♥ 2♣ ("tens with jack kicker") defeats 10 ♣ 10♠ 6♠ 4♥ 2♥ ("tens with six kicker")

2♦ 2♥ 8♠ 5♣ 4♣ ("deuces, eight-five-four") defeats 2 ♣ 2♠ 8♣ 5♥ 3♥ ("deuces, eight-five-three")

High Card

A high-card or no-pair hand is a poker hand such as K♥ J♣ 8♣ 7♦ 3♠, in which no two cards have the same rank, the five cards are not in sequence, and the five cards are not all the same suit. It can also be referred to as "nothing" or "garbage," and many other derogatory terms. It ranks below all other poker hands. Two such hands are ranked by comparing the highest ranking card; if those are equal, then the next highest ranking card; if those are equal, then the third highest ranking card, etc. No-pair hands are described by the one or two highest cards in the hand, such as "king high" or "ace-queen high", or by as many cards as are necessary to break a tie.

Examples:

A♦ 10♦ 9♠ 5♣ 4♣ ("ace high") defeats K♠ Q♦ J♣ 8♥ 7♥ ("king high")

A♣ Q♣ 7♦ 5♥ 2♣ ("ace-queen") defeats A♦ 10♦ 9♠ 5 ♣ 4♣ ("ace-ten")

7♠ 6♣ 5♣ 4♦ 2♥ ("seven-six-five-four") defeats 7 ♣ 6♦ 5♦ 3♥ 2♣ ("seven-six-five-three")

Decks Using a Bug

The use of joker as a bug creates a slight variation of game play. When a joker is introduced in standard poker games it functions as a fifth ace, or can be used as a flush or straight card (though it can be used as a wild card too). Normally casino draw poker variants use a joker, and thus the best possible hand is five of a kind, as in A♥ A♦ A♣ A♠ Joker.

Rules of Caribbean Stud

Caribbean Stud™ poker may be played as follows. A player and a dealer are each dealt five cards. If the dealer has a poker hand having a value less than Ace-King combination or better, the player automatically wins. If the dealer has a poker hand having a value of an Ace-King combination or better, then the higher of the player's or the dealer's hand wins. If the player wins, he may receive an additional bonus payment depending on the poker rank of his hand. In the commercial play of the game, a side bet is usually required to allow a chance at a progressive jackpot. In Caribbean Stud™ poker, it is the dealer's hand that must qualify. As the dealer's hand is partially concealed during play (usually only one card, at most) is displayed to the player before player wagering is complete), the player must always be aware that even ranked player hands can lose to a dealer's hand and no bonus will be paid out unless the side bet has been made, and then usually only to hands having a rank of a flush or higher.

Rules of Blackjack

Some versions of Blackjack are now described. Blackjack hands are scored according to the point total of the cards in the hand. The hand with the highest total wins as long as it is 21 or less. If the total is greater than 21, it is a called a "bust." Numbered cards 2 through 10 have a point value equal to their face value, and face cards (i.e., Jack, Queen and King) are worth 10 points. An Ace is worth 11 points unless it would bust a hand, in which case it is worth 1 point. Players play against the dealer and win by having a higher point total no greater than 21. If the player busts, the player loses, even if the dealer also busts. If the player and dealer have hands with the same point value, this is called a "push," and neither party wins the hand.

After the initial bets are placed, the dealer deals the cards, either from one or more, but typically two, hand-held decks of cards, or from a "shoe" containing multiple decks of cards, generally at least four decks of cards, and typically many more. A game in which the deck or decks of cards are hand-held is known as a "pitch" game. "Pitch" games are generally not played in casinos. When playing with more than one deck, the decks are shuffled together in order to make it more difficult to remember which cards have been dealt and which have not. The dealer deals two cards to each player and to himself. Typically, one of the dealer's two cards is dealt face-up so that all players can see it, and the other is face down. The face-down card is called the "hole card." In a European variation, the "hole card" is dealt after all the players' cards are dealt and their hands have been played. The players' cards are dealt face up from a shoe and face down if it is a "pitch" game.

A two-card hand with a point value of 21 (i.e., an Ace and a face card or a 10) is called a "Blackjack" or a "natural" and wins automatically. A player with a "natural" is conventionally paid 3:2 on his bet, although in 2003 some Las Vegas casinos began paying 6:5, typically in games with only a single deck.

Once the first two cards have been dealt to each player and the dealer, the dealer wins automatically if the dealer has a "natural" and the player does not. If the player has a "natural" and the dealer does not, the player automatically wins. If the dealer and player both have a "natural," neither party wins the hand.

If neither side has a "natural," each player completely plays out their hand; when all players have finished, the dealer plays his hand.

The playing of the hand typically involves a combination of four possible actions "hitting," "standing," "doubling down," or "splitting" his hand. Often another action called "surrendering" is added. To "hit" is to take another card. To "stand" is to take no more cards. To "double down" is to double the wager, take precisely one more card and then "stand." When a player has identical value cards, such as a pair of 8s, the player can "split" by placing an additional wager and playing each card as the first card in two new hands. To "surrender" is to forfeit half the player's bet and give up his hand. "Surrender" is not an option in most casino games of Blackjack. A player's turn ends if he "stands," "busts" or "doubles down." If the player "busts," he loses even if the dealer subsequently busts. This is the house advantage.

After all players have played their hands, the dealer then reveals the dealer's hole card and plays his hand. According to house rules (the prevalent casino rules), the dealer must hit until he has a point total of at least 17, regardless of what the players have. In most casinos, the dealer must also hit on a "soft" 17 (e.g., an Ace and 6). In a casino, the Blackjack table felt is marked to indicate if the dealer hits or stands on a soft 17. If the dealer busts, all remaining players win. Bets are normally paid out at odds of 1:1.

Four of the common rule variations are one card split Aces, early surrender, late surrender and double-down restrictions. In the first variation, one card is dealt on each Ace and the player's turn is over. In the second, the player has the option to surrender before the dealer checks for Blackjack. In the third, the player has the option to surrender after the dealer checks for Blackjack. In the fourth, doubling-down is only permitted for certain card combinations.

Insurance

Insurance is a commonly-offered betting option in which the player can hedge his bet by wagering that the dealer will win the hand. If the dealer's "up card" is an Ace, the player is offered the option of buying Insurance before the dealer checks his "hole card." If the player wishes to take Insurance, the player can bet an amount up to half that of his original bet. The Insurance bet is placed separately on a special portion of the table, which is usually marked with the words "Insurance Pays 2:1." The player buying Insurance is betting that the dealer's "hole card" is one with a value of 10 (i.e., a 10, Jack, Queen or King). Because the dealer's up card is an Ace, the player who buys Insurance is betting that the dealer has a "natural."

If the player originally bets $10 and the dealer shows an Ace, the player can buy Insurance by betting up to $5. Suppose the player makes a $5 Insurance bet and the player's hand with the two cards dealt to him totals 19. If the dealer's hole card is revealed to be a 10 after the Insurance betting period is over (the dealer checks for a "natural" before the players play their hands), the player loses his original $10 bet, but he wins the $5 Insurance bet at odds of 2:1, winning $10 and therefore breaking even. In the same situation, if the dealer's hole card is not one with a value of ten, the player immediately loses his $5 Insurance bet. But if the player chooses to stand on 19, and if the dealer's hand has a total value less than 19, at the end of the dealer's turn, the player wins his original $10 bet, making a net profit of $5. In the same situation, if the dealer's hole card is not one with a value of ten, again the player will immediately lose their $5 Insurance bet, and if the dealer's hand has a total value greater than the player's at the end of both of their turns, for example the player stood on 19 and the dealer ended his turn with 20, the player loses both his original $10 bet and his $5 Insurance bet.

Basic Strategy

Blackjack players can increase their expected winnings by several means, one of which is "basic strategy." "Basic strategy" is simply something that exists as a matter of general practice; it has no official sanction. The "basic strategy" determines when to hit and when to stand, as well as when doubling down or splitting in the best course. Basic strategy is based on the player's point total and the dealer's visible card. Under some conditions (e.g., playing with a single deck according to downtown Las Vegas rules) the house advantage over a player using basic strategy can be as low as 0.16%. Casinos offering options like surrender and double-after-split may be giving the player using basic strategy a statistical advantage and instead rely on players making mistakes to provide a house advantage.

A number of optional rules can benefit a skilled player, for example: if doubling down is permitted on any two-card hand other than a natural; if "doubling down" is permitted after splitting; if early surrender (forfeiting half the bet against a face or Ace up card before the dealer checks for Blackjack) is permitted; if late surrender is permitted; if re-splitting Aces is permitted (splitting when the player has more than two cards in their hand, and has just been dealt a second ace in their hand); if drawing more than one card against a split Ace is permitted; if five or more cards with a total no more than 21 is an automatic win (referred to as "Charlies").

Other optional rules can be detrimental to a skilled player. For example: if a "natural" pays less than 3:2 (e.g., Las Vegas Strip single-deck Blackjack paying out at 6:5 for a "natural"); if a hand can only be split once (is re-splitting possible for other than aces); if doubling down is restricted to certain totals (e.g., 9 11 or 10 11); if Aces may not be re-split; if the rules are those of "no-peek" (or European) Blackjack, according to which the player loses hands that have been split or "doubled down" to a dealer who has a "natural" (because the dealer does not check for this automatically winning hand until the players had played their hands); if the player loses ties with the dealer, instead of pushing where neither the player or the dealer wins and the player retains their original bet.

Card Counting

Unlike some other casino games, in which one play has no influence on any subsequent play, a hand of Blackjack removes those cards from the deck. As cards are removed from the deck, the probability of each of the remaining cards being dealt is altered (and dealing the same cards becomes impossible). If the remaining cards have an elevated proportion of 10-value cards and Aces, the player is more likely to be dealt a natural, which is to the player's advantage (because the dealer wins even money when the dealer has a natural, while the player wins at odds of 3:2 when the player has a natural). If the remaining cards have an elevated proportion of low-value cards, such as 4s, 5s and 6s, the player is more likely to bust, which is to the dealer's advantage (because if the player busts, the dealer wins even if the dealer later busts).

The house advantage in Blackjack is relatively small at the outset. By keeping track of which cards have been dealt, a player can take advantage of the changing proportions of the remaining cards by betting higher amounts when there is an elevated proportion of 10-value cards and Aces and by better lower amounts when there is an elevated proportion of low-value cards. Over time, the deck will be unfavorable to the player more often than it is favorable, but by adjusting the amounts that he bets, the player can overcome that inherent disadvantage. The player can also use this information to refine basic strategy. For instance, basic strategy calls for hitting on a 16 when the dealer's up card is a 10, but if the player knows that the deck has a disproportionately small number of low-value cards remaining, the odds may be altered in favor of standing on the 16.

There are a number of card-counting schemes, all dependent for their efficacy on the player's ability to remember either a simplified or detailed tally of the cards that have been played. The more detailed the tally, the more accurate it is, but the harder it is to remember. Although card counting is not illegal, casinos will eject or ban successful card counters if they are detected.

Shuffle tracking is a more obscure, and difficult, method of attempting to shift the odds in favor of the player. The player attempts to track groups of cards during the play of a multi-deck shoe, follow them through the shuffle, and then looks for the same group to reappear from the new shoe, playing and betting accordingly.

XIV. Casino Countermeasures

Some methods of thwarting card counters include using a large number of decks. Shoes containing 6 or 8 decks are common. The more cards there are, the less variation there is in the proportions of the remaining cards and the harder it is to count them. The player's advantage can also be reduced by shuffling the cards more frequently, but this reduces the amount of time that can be devoting to actual play and therefore reduces the casino profits. Some casinos now use shuffling machines, some of which shuffle one set of cards while another is in play, while others continuously shuffle the cards. The distractions of the gaming floor environment and complimentary alcoholic beverages also act to thwart card counters. Some methods of thwarting card counters include using varied payoff structures, such Blackjack payoff of 6:5, which is more disadvantageous to the player than the standard 3:2 Blackjack payoff.

XV. Video Wagering Games

Video wagering games are set up to mimic a table game using adaptations of table games rules and cards.

In one version of video poker the player is allowed to inspect five cards randomly chosen by the computer. These cards are displayed on the video screen and the player chooses which cards, if any, that he or she wishes to hold. If the player wishes to hold all of the cards, i.e., stand, he or she presses a STAND button. If the player wishes to hold only some of the cards, he or she chooses the cards to be held by pressing HOLD keys located directly under each card displayed on the video screen. Pushing a DEAL button after choosing the HOLD cards automatically and simultaneously replaces the unchosen cards with additional cards which are randomly selected from the remainder of the deck. After the STAND button is pushed, or the cards are replaced, the final holding is evaluated by the game machine's computer and the player is awarded either play credits or a coin payout as determined from a payoff table. This payoff table is stored in the machine's computer memory and is also displayed on the machine's screen. Hands with higher poker values are awarded more credits or coins. Very rare poker hands are awarded payoffs of 800-to-1 or higher.

XVI. Apparatus for Playing Over a Communications System

In some embodiments, there is a plurality of player units 40-1 to **40-*n* which are coupled via a communication system 41, such as the Internet, with a game playing system comprising an administration unit 42, a player register 43, and a game unit 45. Each unit 40** is typically a personal computer with a display unit and control means (a keyboard and a mouse).

When a player logs on to the game playing system, their unit 40 identifies itself to the administration unit. The system holds the details of the players in the register 43, which contains separate player register units 44-1 to **44-*n*** for all the potential players, i.e., for all the members of the system.

Once the player has been identified, the player is assigned to a game unit 45. The game unit contains a set of player data units 46-1 to 46-6, a dealer unit 47, a control unit 48, and a random dealing unit 49.

Up to seven players can be assigned to the game unit 45. There can be several such units, as indicated, so that several games can be played at the same time if there are more than seven members of the system logged on at the same time.

The assignment of a player unit 40 to a player data unit 46 may be arbitrary or random, depending on which player data units 46 and game units 45 are free. Each player data unit 46 is loaded from the corresponding player register unit 44 and also contains essentially the same details as the corresponding player unit 40, and is in communication with the player unit 40 to keep the contents of the player unit and player data unit updated with each other. In addition, the appropriate parts of the contents of the other player data units 46 and the dealer unit 47 are passed to the player unit 40 for display.

The logic unit 48 of the game unit 45 steps the game unit through the various stages of the play, initiating the dealer actions and awaiting the appropriate responses from the player units 40. The random dealing unit 49 deals cards essentially randomly to the dealer unit 47 and the player data units 46. At the end of the hand, the logic unit passes the results of the hand, i.e., the wins and/or losses, to the player data units 46 to inform the players of their results. The administrative unit 42 also takes those results and updates the player register units 44 accordingly.

The player units 40 are arranged to show a display. To identify the player, the player's position is highlighted. As play proceeds, so the player selects the various boxes, enters bets in them, and so on, and the results of those actions are displayed. As the cards are dealt, a series of overlapping card symbols is shown in the Bonus box. At the option of the player, the cards can be shown in a line below the box, and similarly for the card dealt to the dealer. At the end of the hand, a message is displayed informing the player of the results of their bets, i.e., the amounts won or lost.

XVII. Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

XVIII. References

The following patents and patent applications are hereby incorporated by reference herein for all purposes: U.S. Pat. No. 6,579,181, U.S. Pat. No. 6,299,536, U.S. Pat. No. 6,093,103, U.S. Pat. No. 5,941,769, U.S. Pat. No. 7,114,718, U.S. patent application Ser. No. 10/622,321, U.S. Pat. No. 4,515,367, U.S. Pat. No. 5,000,453, U.S. Pat. No. 7,137,630, and U.S. Pat. No. 7,137,629.

What is claimed is:

1. An apparatus comprising:

a processor;

a communication link; and a non-transitory medium having stored thereon a plurality of instructions that when executed by the processor cause the apparatus to:

provide an application program interface through which a remote algorithmic gaming entity may submit gaming commands using the communication link;

receive, through the application program interface, an indication of a first amount of money from the remote algorithmic gaming entity to be used in a gaming market;

based on current and historic gaming demand, determine one or more portions of the amount of money to expose to the gaming market on behalf of the remote algorithmic gaming entity;

expose the one or more portions to the gaming market, in which exposing includes entering the remote algorithmic gaming entity into games that have been established by remote users prior to receiving the indication of the first amount of money and populating game entry interfaces of remote users with new games in response to receiving the indication of the first amount of money;

match at least one portion of the exposed amount with at least one counter party to form at least one game between the entity and at least one counter party, in which the at least one game includes a fantasy sports game;

in response to matching the at least one portion, record information regarding the formed at least one game in a data structure;

in response to matching the at least one portion, determine one or more additional portions of the amount to expose to the gaming market based on matching the at least one portion;

expose the one or more additional portions of the amount to the gaming market in response to matching the at least one portion;

receive, through the application program interface, an indication of a second amount of money from the remote algorithmic gaming entity to be used in the gaming market;

match a plurality of additional portions of the exposed one or more portions with a first plurality of additional counter parties to form a first plurality of additional games and match at least a part of the second amount of money with a second plurality of counter parties to form a second plurality of games, in which matching the plurality of additional portions and matching that at least a part of the second amount of money includes preventing the additional portions from being matched against any of the at least a part of the second amount of money;

receive, through the communication link, a respective first fantasy team for each of the first plurality of additional games selected through a gaming interface by each of the first plurality of counter parties;

receive, through the communication link, a respective second fantasy team for each of the second plurality of games selected through a gaming interface by each of the second counterparties;

receive, through the application program interface, a first selection of a third fantasy team for all of the first plurality of additional games and a second selection of a fourth fantasy team for all of the second plurality of games;

set characteristics for the first plurality of additional games and the second plurality of games, in which the characteristics are set to match the respective received teams, in which the characteristics for each game include a spread between the teams, in which the spread is determined by: a) determining a sum of expected point value to be earned by members of each team in a respective game; and b) determining the difference between the sums;

resolve the first plurality of additional games and the second plurality of games.

2. The apparatus of claim 1, in which resolving the games includes determining an outcome for the games based on one or more events and adjusting one or more monetary accounts in response.

3. The apparatus of claim 1, in which the at least one portion includes a plurality of portions that are matched with respective counter interests from respective gamers to form respective games so that the gaming entity is entered into a plurality of respective games with a plurality of respective gamers.

4. The apparatus of claim 1, in which each of the games includes a fantasy sports game.

5. The apparatus of claim 1, in which the one or more portions include a plurality of portions that sum to less than the amount of money.

6. The apparatus of claim 1, in which determining the one or more portions includes determining the one or more portions based on historical demand for games such that the portions are expected to meet expected demand.

7. The apparatus of claim 1, in which the algorithmic gaming entity includes at least one of a hedge fund, and a mutual fund.

8. The apparatus of claim 1, in which the counter party includes a natural gamer.

9. The apparatus of claim 1, in which matching the at least one portion includes: receiving a request from the counter party to join a first league of the fantasy sports leagues and entering the counter party into the league to form the game.

10. The apparatus of claim 1, in which determining the one or more additional portions includes determining one or more replacement portions for the at least one portion.

11. The apparatus of claim 10, in which the one or more replacement portions are determining based on demand for gaming such that changing demand is expected to be met by the replacement portions.

12. The apparatus of claim 1, in which exposing the at least one portion includes exposing a plurality of portions of varying sizes.

13. The apparatus of claim 1, in which exposing the at least one portion includes exposing a plurality of portions that vary based on a changing demand.

14. The apparatus of claim 1, in which exposing the at least one portion includes exposing a plurality of portions and adjusting the plurality of portions to simulate gaming activity.

15. The apparatus of claim 1, in which the first amount of money is based on a first gaming algorithm and the second amount of money is based on a second gaming algorithm.

16. The apparatus of claim 1, in which matching the at least the part of the second amount of money includes matching the to maintain a ratio of matches between the first amount of money and the second amount of money that is specified by the remote algorithmic gaming entity.

* * * * *